Patented Mar. 25, 1952

2,590,105

UNITED STATES PATENT OFFICE 2,590,105

PRODUCTION OF FATTY ALCOHOLS

Eric C. Kunz, Montclair, and Alphonse T. Fiore, Teaneck, N. J., assignors to The Givaudan Corporation, a corporation of New Jersey No Drawing. Application June 22, 1945, Serial No. 601,066

9 Claims. (Cl. 260—638)

This invention relates to a process for preparing aliphatic alcohols containing eleven to eighteen carbon atoms, and to novel compositions of matter suitable for use in the process.

It is known that aliphatic alcohols containing from eleven to eighteen carbon atoms possess properties which make them peculiarly suitable for certain applications. Thus, either as such, i. e., as alcohols, or when used as chemical intermediates, they have found an already extensive use in several industries, among which may be mentioned the food, pharmaceutical, cosmetic and detergent fields. There can be no question but that the commercial importance of this group of alcohols, though substantial at the present time, will continue to increase for some time.

As would be supposed in view of the commercial significance of these alcohols, considerable efforts have been made to develop satisfactory processes for their production. Indeed, several distinct chemical processes have already been developed. However, these known methods are subject to several important disadvantages. Some of the methods are merely laboratory methods, that is to say, because of their nature these methods cannot be applied on a commercial scale, because, e. g., of the high costs entailed. Other prior art methods, though of commercial nature, fall short because of poor yields, the formation of by-products and the need for careful chemical purification technique.

By our present invention we have succeeded in developing a commercially feasible and technically simple process for making substantially pure aliphatic alcohols having eleven to eighteen carbon atoms. Our process is especially characterized by the following desirable features: high yields of the alcohols, unusually small amount of by-products formed, and the fact that the alcohols are formed in such purity that there is no need to resort to chemical purification techniques in order to obtain the alcohols in substantially pure form.

The results obtained by our process were quite unexpected. In the first place, the prior art, which knew that alcohols could be prepared by treating salts of carboxylic acids with hydrogen at elevated temperatures and pressures, expressly taught that the presence of fatty acids in such a reaction was undesirable as they were not themselves reduced to the alcohols. It will be noted that we utilize a preponderant amount of fatty acids in comparison with the salt of the acid, thereby going directly against the teachings of the prior art.

Also, whatever may be the mechanism of the reaction of our process, it appears to be sufficiently specific that it requires copper salts. That is to say, as far as we are now aware, only copper salts are operable in our process. The corresponding cobalt, nickel, lead and cadmium salts result in the unsatisfactory reduction of fatty acids to the corresponding alcohols. Such a specificity, as regards copper salts, was unpredictable.

In the process of this invention aliphatic acids containing eleven to eighteen carbon atoms are reacted under elevated temperatures and pressures with hydrogen in the presence of the copper salts of the corresponding acids.

In general, the process may be carried out by introducing a mixture of the aliphatic acid and the copper salt of the acid in a suitable pressure vessel, adding sufficient hydrogen to attain a predetermined pressure, applying heat while agitating the vessel and/or its contents until the desired temperature is reached, and thereafter maintaining agitation as well as the predetermined temperature and pressure conditions over a predetermined length of time. Heat is then discontinued, the contents are cooled and the gases permitted to escape. The solids and water are removed by filtration while the organic reaction products are in a molten condition, and substantially pure alcohols or a mixture thereof are obtained from the remainder, for example by vacuum distillation.

The fatty acids employed herein may be saturated fatty acids; or, if desired, they may contain carbon to carbon unsaturated bonds.

As regards the copper salts of fatty acids, we prefer to use the cupric salt of the fatty acid being reacted. However, where two or more fatty acids are being reacted, we prefer to use a cupric salt of any one or all of the acids being reacted. If desired, in special cases, the cupric salt of an acid other than any of the ones to be reacted may be employed, so long as it is a cupric salt of an aliphatic acid containing eleven to eighteen carbon atoms.

We have found that satisfactory results are obtained when the copper salts are employed in amounts as low as 5%, by weight, of the amount of acid being reacted. Amounts up to 50%, on the same basis, have also been employed to advantage. However, it is preferred to use amounts of from about 10% to about 30% of copper salts, on the above-indicated basis. The acid-copper salt mixtures are greenish blue in color.

The copper salts used in this invention may be prepared in any convenient way and it is understood that the invention is not to be restricted to copper salts prepared in any particular way. By way of example of a preferred manner in which to prepare the copper salts may be mentioned the process wherein are mixed two aqueous solutions containing equivalent amounts, respectively, of the soluble sodium or potassium salt of the carboxylic acid (which may be made by reacting the carboxylic acid with an aqueous solution of sodium or potassium hydroxide) and of a water soluble inorganic salt of copper. The resulting precipitate of the copper salt is filtered, washed and dried.

Hydrogen is always employed in considerable excess over the amount required for the reaction. It is not possible to be more specific in this regard other than to state that sufficient hydrogen is employed so that the desired hydrogenation occurs and the pressure at the end of the reaction period is 2000–3500 pounds per square inch, at the temperatures of the reaction.

The reaction may be conducted for varying times, depending on the acid, salt, pressure and temperature employed. We have obtained satisfactory results in twenty minutes, whereas some reactions require as much as twenty-four hours for maximum yields. In general, however, we prefer to conduct the reaction from about two to about twelve hours.

Pressures from about 1500 to about 3000 pounds per square inch may be employed, though best results are obtained with pressures from about 2000 to about 3000 pounds. Temperatures from about 200° C. to about 300° C. have been satisfactory, though it is preferred to operate between about 250° and 300° C.

The invention is illustrated by the following examples, without, however, limiting the same to them.

Example I

To 1000 grams of 2-B alcohol containing 130 grams of Armour palmitic acid (M. P. 56° C., and titrating 98.5% as free acid) was added 65 grams of commercial liquid potash (45% as KOH). The mixture was heated to 70° C. and a solution of 61 grams copper nitrate (hexahydrate) in 100 grams 2-B alcohol was added during one hour. Agitation and temperature was maintained for an additional hour and the resulting precipitate of cupric palmitate filtered. After washing with aqueous alcohol (50%) the filter cake was first air dried, followed by vacuum drying, resulting in approximately 145 grams of cupric palmitate analyzing 11.52% copper.

Example II

Thirty grams of cupric palmitate prepared as in Example I were dissolved in 120 grams of palmitic acid (Armour) by heating to 90°–95° C. and charged into a stainless steel insert of 700 cc. capacity. The insert, after cooling, was then set into a standard rocking type autoclave of 3000 cc. capacity manufactured by the American Instrument Co. Two specially prepared fittings were used to anchor the insert within the rocking autoclave.

The air was removed from the system with high vacuum and hydrogen was introduced at 1300 pounds pressure. The unit was then electrically heated without rheostat control and within a few minutes the temperature rose to 80°–100° C. and rocking was begun. Within one and one half hours, an operating temperature of 275° C. and pressure of 2300 pounds was reached. The temperature was maintained with a rheostat control. It was noted that hydrogen absorption took place immediately and continued for four hours, during which time the pressure dropped to 2070 pounds. The system was then cooled, pressure released and the contents of the stainless steel insert removed at 70°–80° C. to insure a molten condition.

The reaction product contained water and finely divided solids which suspended readily and gave the mass a black appearance. However, by filtering the product, maintained at approximately 90° C., through a filter aid such as "celite" or "supercel" a clear water white product was obtained free of color. The filtered product was analyzed and found to contain 97.5% acetylizable constituents as cetyl alcohol. An analytical comparison of the starting fatty acid and end product follows:

|  |  | Palmitic Acid | Reduction Product |
|---|---|---|---|
| Congealing Point | °C | 55 | 48 |
| Melting Point | °C | 56 | 51 |
| Per Cent Acid | | 98.5 | 0.0 |
| Per Cent Ester | | 1.3 | 4.55 |
| Per Cent Free Alcohol | | 0.0 | 95.20 |

No evidence of hydrocarbon formation could be found.

By practical vacuum distillation of the filtered product at 5 mm. mercury pressure a fraction boiling at 145° C. to 147° C. and being pure cetyl alcohol was obtained, in addition to about 8% of myristyl and stearyl alcohol. The source of myristyl and stearyl alcohols is in the starting fatty acid. The acid, as is evident from analysis, is not a chemically pure acid and represents the quality of commercial acid available by specialized fractionation of natural fatty acid mixtures and contains myristic and stearic acids, which are reduced to the corresponding alcohols in the process.

It may be noted that as compared with the products of other processes the cetyl alcohol formed in accordance with this example is such as to make it especially preferred for cosmetic purposes.

Similarly, other fatty alcohols have been prepared. Thus undecylenic acid in the presence of its cupric salt or copper undecylate yields undecyclic alcohol; lauric acid in the presence of copper laurate yields lauryl alcohol; myristic acid in the presence of copper myristate yields myristyl alcohol; stearic acid in the presence of copper stearate yields stearyl alcohol; and palmitoleic acid in the presence of its copper salt or copper palmitate yields cetyl alcohol.

The foregoing illustrates the practice of this invention, which however, is not to be limited thereby but is to be construed as broadly as permissible in view of the prior art and limited solely by the appended claims.

We claim:

1. The process for preparing saturated aliphatic alcohols containing eleven to eighteen carbon atoms in the molecule, which comprises reacting an aliphatic carboxylic acid having eleven to eighteen carbon atoms, a copper salt of such acid and hydrogen, under elevated temperature and pressure said acid being present at the start of the reaction in preponderating amount in comparison with said salt.

2. The process for preparing saturated aliphatic alcohols containing eleven to eighteen carbon atoms in the molecule, which comprises reacting an aliphatic carboxylic acid having eleven to eighteen carbon atoms, a copper salt of such acid and hydrogen, at a temperature within the range of about 200° C. to about 300° C. and under a pressure within the range of about 1500 to about 3500 pounds per square inch said acid being present at the start of the reaction in preponderating amount in comparison with said salt.

3. The process for preparing saturated aliphatic alcohols containing eleven to eighteen carbon atoms in the molecule, which comprises reacting an aliphatic carboxylic acid having eleven to eighteen carbon atoms, a copper salt of such acid and hydrogen, at a temperature within the range of about 250° C. to about 300° C. and under a pressure within the range of about 2000 to about 3000 pounds per square inch said acid being present at the start of the reaction in preponderating amount in comparison with said salt.

4. The process for preparing saturated aliphatic alcohols containing eleven to eighteen carbon atoms in the molecule, which comprises reacting an aliphatic carboxylic acid having eleven to eighteen carbon atoms, a copper salt of such acid and hydrogen, at a temperature within the range of about 250° C. to about 300° C. and under a pressure within the range of about 2000 to about 3000 pounds per square inch, the amount of said copper salt being within the range of about 10% to about 30%, by weight, of the amount of aliphatic carboxylic acid employed.

5. The process for preparing cetyl alcohol which comprises reacting palmitic acid, cupric palmitate and hydrogen under high temperature and pressure said acid being present at the start of the reaction in preponderating amount in comparison with said salt.

6. The process for preparing cetyl alcohol which comprises reacting palmitic acid, cupric palmitate and hydrogen at a temperature within the range of about 250° C. to about 300° C. and under a pressure within the range of about 2000 to about 3000 pounds per square inch said acid being present at the start of the reaction in preponderating amount in comparison with said salt.

7. The process for preparing cetyl alcohol which comprises reacting palmitic acid, cupric palmitate and hydrogen at a temperature within the range of about 250° C. to about 300° C. and under a pressure within the range of about 2000 to about 3000 pounds per square inch, the amount of cupric palmitate being within the range of about 10% to about 30%, by weight, of the amount of palmitic acid employed.

8. The process for preparing lauryl alcohol which comprises reacting lauric acid, cupric laurate and hydrogen under high temperature and pressure said acid being present at the start of the reaction in preponderating amount in comparison with said salt.

9. The process for preparing stearyl alcohol, which comprises reacting stearic acid, cupric stearate and hydrogen under high temperature and pressure said acid being present at the start of the reaction in preponderating amount in comparison with said salt.

ERIC C. KUNZ.
ALPHONSE T. FIORE.

REFERENCES CITED

The following references are of record in the file of this patent:

UNITED STATES PATENTS

| Number | Name | Date |
|---|---|---|
| Re. 20,447 | Schrauth et al. | July 13, 1937 |
| 2,116,552 | Arnold et al. | May 10, 1938 |
| 2,340,690 | Richardson et al. | Feb. 1, 1944 |
| 2,375,495 | Richardson et al. | May 8, 1945 |